Jan. 3, 1933.  J. F. GAYLORD  1,893,405
FREE WHEELING TRANSMISSION
Filed June 1, 1931   2 Sheets-Sheet 1
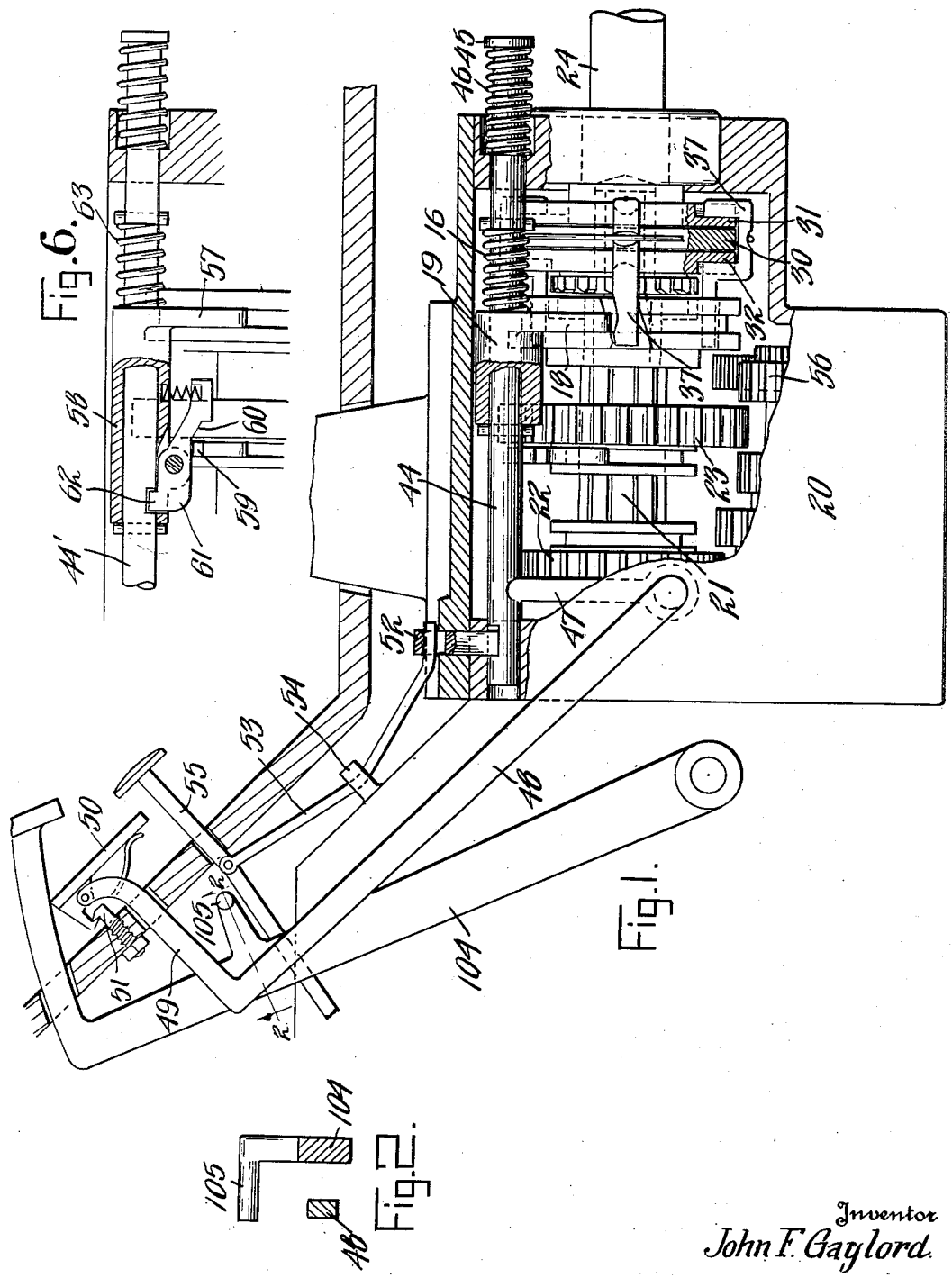
Inventor
John F. Gaylord.
By
Attorney Jan. 3, 1933.    J. F. GAYLORD    1,893,405
FREE WHEELING TRANSMISSION
Filed June 1, 1931    2 Sheets-Sheet 2
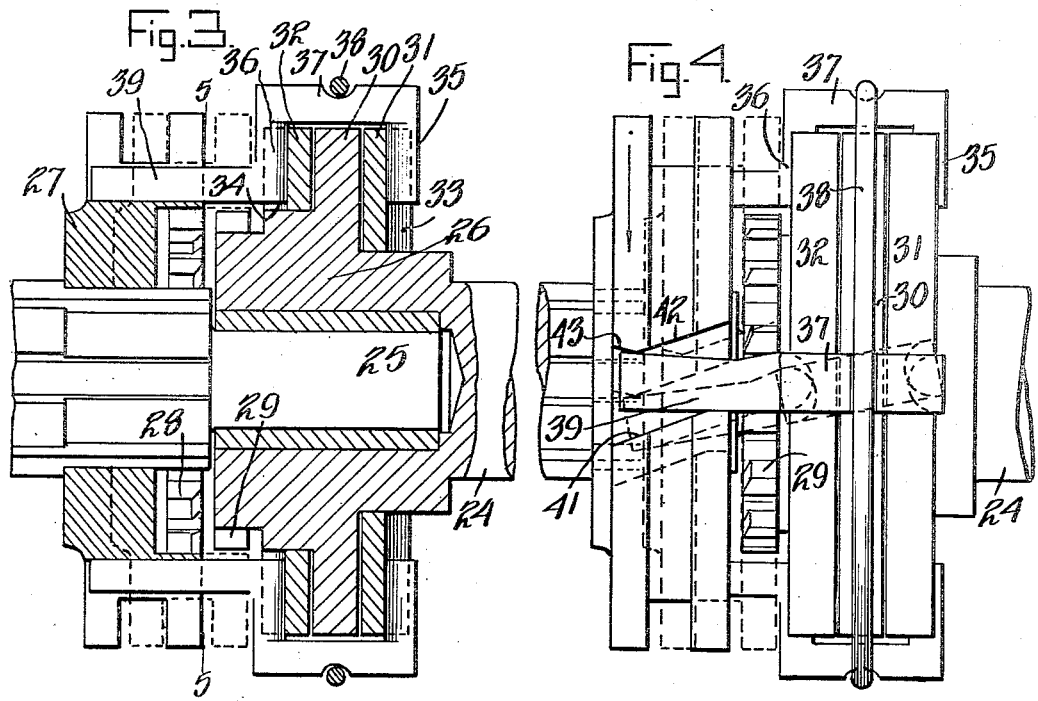
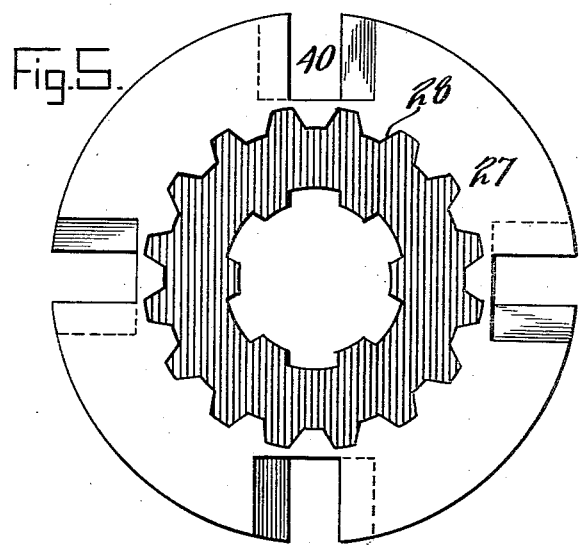
Inventor
John F. Gaylord.
By
E. W. Bradford
Attorney Patented Jan. 3, 1933

1,893,405

UNITED STATES PATENT OFFICE

JOHN F. GAYLORD, OF MUNCIE, INDIANA, ASSIGNOR, BY DIRECT AND MESNE ASSIGNMENTS, TO THE GAYLORD COMPANY, INC., OF HOMER, LOUISIANA, A CORPORATION OF LOUISIANA

FREE WHEELING TRANSMISSION

Application filed June 1, 1931. Serial No. 541,443.

This invention relates to automobile transmissions and particularly to means for effecting free wheeling and an object of the invention is to provide new and improved free wheeling devices.

A further object is to provide a free wheeling device operable by the foot of the operator within the vehicle.

A further object is to provide in a free wheeling device means releasable in connection with operation of the accelerator for moving a positive clutch into engaging position.

Other objects and advantages will become apparent from the description which follows:

Referring to the accompanying drawings which are made a part hereof and on which similar reference characters indicate similar parts, Figure 1 is a vertical section of a transmission gear housing showing my invention applied thereto, Figure 2, a section on line 2—2 of Figure 1, Figure 3, a longitudinal section of the clutch and associated elements, Figure 4, a plan view of the clutch shown in Figure 3, Figure 5, a section on line 5—5 of Figure 3, and Figure 6, a section of a modified clutch shifting shaft showing means operated in connection with shifting into reverse for clutching positive clutch elements.

In the drawings numeral 20 indicates the usual gear housing in which an intermediate shaft 21 supporting the usual gears 22, 23, etc. is housed. A driven shaft 24 is connected to the driven elements of the automobile. The intermediate shaft 21 has a small end 25 which is journaled in suitable bearings in an enlarged end 26 of the driven shaft 24. A ring 27 is keyed to the end of the intermediate shaft 21 and slidable axially thereon and this ring is provided with internal teeth 28 which mesh with external teeth 29 on the end of the enlarged portion 26 of the driven shaft when the ring is moved axially into positive clutching position. Except when positively clutched together the driving is effected by means which permit the driven element to rotate independently of the driving element when the driven element tends to move faster than the driving element such as when coasting down grade. The means which permit this free wheeling are shown more clearly in Figures 3, 4 and 5. The enlarged portion 26 of the driven shaft has a flange 30 on the opposite sides of which are positioned rings or disks 31 and 32 which may be brought into frictional engagement with the flange 30 to provide a frictional drive for the driven shaft. The disks 31 and 32 are provided with radial slots 33 and 34 into which fit portions 35 and 36 of U-shaped members 37. The U-shaped members are held in place by means of a ring 38 which fits in a groove in the back of the U-shaped members. These U-shaped members have extended ends 39 which engage with notches 40 in the ring 27. The notches 40 in the ring just mentioned are provided with one sloping side 41 and an opposite side 42 which is parallel with the side 41 for a portion of its distance and then has an oppositely directed beveled portion 43. The end 39 which extends into this slot provides operating means for the friction rings or disks 31 and 32. When the engine is running in a forward direction the ring 27 rotates in the direction of the arrow shown in Figure 4. The slot 40 permits the member 37 to swing around so as to move the friction rings or disks 31, 32 into engagement with the flange 30 so as to drive the driven shaft positively. If the driven shaft tends to run faster than the driving shaft the member 37 is moved to the position shown in Figure 4 in which the friction rings are held out of frictional engagement with the flange 30 so that the driven shaft may rotate independently of the former driving member. In other words coasting is permitted.

If, however, it is desired positively to clutch the elements together, the ring 27 is moved axially to bring the internal teeth 28 into engagement with the teeth 29. This is done by means of a shaft 44 which is journaled in and slidable axially in the housing 20. The shaft carries a collar 19 having a depending fork 18 engageable with an annular groove on the ring 27. The collar 19 is slidable relative to the shaft 44 being positioned between a pin in the shaft 44 and a spring 16. The shaft 44 has an enlarged end 45 against which one end of a compression spring 46 seats, the other end seating against the bottom of a bore in the housing. The spring tends to move the shaft 44 to the right to clutch the elements positively together. A spring 16 is positioned around the shaft 44 between a pin through the shaft and the collar 19. When the gear 23 is moved to the right to put the car in position for reverse gear it carries with it the collar 19 and moves the ring 27 to the right to bring the clutch teeth 28 and 29 into positive engagement. This insures that the clutch will be in engagement during the reverse movement of the car. When the gear 23 is moved out of reverse gear position the spring 16 will move the collar 19 to withdraw the ring 27 with the clutch teeth 28 out of positive clutching contact with the teeth 29. The movements just defined are carried out when the gears on the vehicle are put into reverse by the usual mechanism on the vehicle. When de-clutching elements 28 and 29, the shaft 44 is moved against the tension of the spring 46 by a series of levers consisting of an arm 47 engageable with the shaft 44 and a lever 48 which has a bent end 49 extending up through the floor of the vehicle. The upper end of the arm 49 is provided with a latch 50 which engages over a hook 51 to hold the parts in position to hold the locking clutch out of engagement.

When the operator wishes to move the clutch into positive engagement he trips the latch 50 with his foot to release it from the hook 51 whereupon the spring 46 moves the bar 44 to the right to bring the positive clutch elements into mesh. It is not expedient to clutch the elements together positively without speeding up the engine. Means therefore are provided which prevent so clutching them unless the accelerator is operated. This consists of a sliding catch 52, the lower end of which engages in a notch in the bar 44. A lever 53 is fulcrumed on a lug 54 on to the housing and has one end engaging a hole in the element 52 and has its other end pivotally attached to the accelerator stem 55. When the accelerator is pushed in, the element 52 is disengaged from the bar 44 so that the bar may be freely moved to the right when released by the operator. This construction insures that the engine will be speeded up before the positive clutch elements engage each other.

In Figure 6 is shown a modified construction in which shaft 44′ carries a collar 58 slidably mounted thereon. The collar is held between a pin through the shaft at one end and abuts against a compression spring 63 at the other end, the spring 63 being held against axial movement by another pin through the shaft. The collar 58 has a depending fork 57 which engages the movable clutch element to bring the positive clutch elements together. When going into the reverse gear position the clutch elements will be brought into positive engagement as described above. The structure shown in Figure 6 provides means for moving the clutch elements into engagement without tripping the latch 50. In order to do this there is a lug 59 mounted on and movable with axially movable gear shifting elements not shown in this figure but shown in Figure 1 which engages the under side of a beveled portion 60 on a rock lever 61. The lever has a lug 62 engageable with a notch in the bar 44′. When going into reverse the lug 59 engages the beveled portion 60 and disengages the lug from the bar 44′ so that the parts may be moved to reverse gear position and at the same time positively bring the clutch teeth 28 into engagement with the teeth 29. Since collar 58 is moved independently of shaft 44′ when the clutch elements are moved into clutching position by reversing gear mechanism it is necessarily made against the tension of spring 63, so when the gear is moved out of reverse spring 63 will move the clutch teeth 28 out of engagement with the teeth 29.

The main clutch pedal 104 of the vehicle has a laterally extending lug 105 which engages the lever 48 to move the positive clutch out of engagement when the main clutch is pressed out.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:

1. In an automobile gear transmission a positive clutch and a friction clutch each composed of separable clutch elements, resilient means biased to move the elements of the positive clutch to clutching engagement with each other, manually operable means for disengaging said positive clutch elements, reversing gear mechanism, and means movable with said reversing gear mechanism for moving the positive clutch elements to clutching engagement with each other, and resilient means automatically operable for disengaging said positive clutch elements when the reversing gear is moved out of reverse position, substantially as set forth.

2. In an automobile gear transmission a positive clutch and a friction clutch each composed of separable clutch elements, resilient means biased to move the elements of the positive clutch to clutching engagement with each other, manually operable means for disengaging said positive clutch elements comprising a shaft having operable connection with one of the elements of the positive clutch, the said resilient means being mounted on the said shaft, reversing gear mechanism, and means movable with said reversing gear mechanism for moving the positive clutch elements to clutching engagement with each other, and resilient means automatically operable for disengaging said positive clutch elements when the reversing gear is moved out of reverse position, substantially as set forth.

3. In an automobile gear transmission a positive clutch and a friction clutch each composed of separable clutch elements, resilient means biased to move the elements of the positive clutch to clutching engagement with each other, manually operable means for disengaging said positive clutch elements comprising a shaft, a collar mounted on said shaft and movable in one direction by the shaft but movable in the same direction independently of the shaft, said collar being operably connected to one of the elements of the positive clutch, reversing gear mechanism, and means movable with said reversing gear mechanism for moving the positive clutch elements to clutching engagement with each other, the said collar being moved with the clutch element and independently of the said shaft, and resilient means automatically operable for disengaging said positive clutch elements when the reversing gear is moved out of reverse position, substantially as set forth.

4. In an automobile gear transmission a positive clutch and a friction clutch each composed of separable clutch elements, resilient means biased to move the elements of the positive clutch to clutching engagement with each other, manually operable means for disengaging said positive clutch elements comprising a shaft, a collar mounted on said shaft and movable in one direction with the shaft but movable in the same direction independently of the shaft, the said resilient means being mounted on the said shaft, reversing gear mechanism, and means movable with said reversing gear mechanism for moving the positive clutch elements to clutching engagement with each other, and resilient means mounted on said shaft in engagement with said collar and biased to resist movement of the collar independently of the shaft and automatically operable for disengaging said positive clutch elements when the reversing gear is moved out of reverse position, substantially as set forth.

In witness whereof, I have hereunto set my hand at Washington, District of Columbia, this twenty-second day of May, A. D. nineteen hundred and thirty-one.

JOHN F. GAYLORD.